(12) United States Patent
Dairoku et al.

(10) Patent No.: US 7,622,535 B2
(45) Date of Patent: Nov. 24, 2009

(54) METHOD FOR CONTINUOUS PRODUCTION OF WATER-ABSORBENT RESIN

(75) Inventors: Yorimichi Dairoku, Himeji (JP); Yoshio Irie, Himeji (JP); Shinichi Fujino, Himeji (JP); Yasuhiro Fujita, Himeji (JP); Kenji Tada, Himeji (JP); Hiroki Inoue, Kyoto (JP); Makoto Nagasawa, Himeji (JP); Hirofumi Shibata, Himeji (JP)

(73) Assignee: Nippon Shokuba Co., Ltd., Osaka (JP)

( * ) Notice: Subject to any disclaimer, the term of this patent is extended or adjusted under 35 U.S.C. 154(b) by 0 days.

(21) Appl. No.: 11/089,160

(22) Filed: Mar. 24, 2005

(65) Prior Publication Data
US 2005/0215734 A1    Sep. 29, 2005

(30) Foreign Application Priority Data
Mar. 24, 2004    (JP) .............................. 2004-087874

(51) Int. Cl.
C08F 2/00 (2006.01)
C08F 236/00 (2006.01)
C08F 20/06 (2006.01)
(52) U.S. Cl. .................... 526/65; 526/303.1; 526/317.1
(58) Field of Classification Search .................... 526/65, 526/303.1, 317.1
See application file for complete search history.

(56) References Cited

U.S. PATENT DOCUMENTS

| | | | |
|---|---|---|---|
| 4,552,938 A | 11/1985 | Mikita et al. | 526/240 |
| 4,857,610 A | 8/1989 | Chmelir et al. | 526/88 |
| 4,893,999 A | 1/1990 | Chmelir et al. | 425/174.4 |
| 4,985,518 A | 1/1991 | Alexander et al. | 526/240 |
| 5,004,761 A | 4/1991 | Yada et al. | 522/3 |
| 5,380,808 A | 1/1995 | Sumiya et al. | 526/317.1 |
| 6,140,395 A | 10/2000 | Hatsuda et al. | 523/319 |
| 6,174,978 B1 | 1/2001 | Hatsuda et al. | 526/240 |
| 6,241,928 B1 | 6/2001 | Hatsuda et al. | 264/216 |
| 6,667,372 B1* | 12/2003 | Miyake et al. | 526/61 |
| 2002/0040095 A1* | 4/2002 | Dairoku et al. | 524/832 |
| 2004/0183235 A1* | 9/2004 | Dairoku et al. | 264/496 |

FOREIGN PATENT DOCUMENTS

| | | |
|---|---|---|
| EP | 0 885 917 A2 | 12/1998 |
| EP | 1 418 000 A2 | 5/2004 |
| JP | 11-302306 | 11/1999 |
| JP | 2005-36100 | 2/2005 |

* cited by examiner

Primary Examiner—William K Cheung
(74) Attorney, Agent, or Firm—Occhiuti Rohlicek & Tsao LLP

(57) ABSTRACT

The present invention relates to a method for continuous production of a water-absorbent resin by use of an continuous polymerization device having a charge part of a monomer aqueous solution; an endless belt on which the monomer and a hydropolymer formed are conveyed; and a discharge part of the hydropolymer, wherein the continuous polymerization device has side walls and a ceiling, and the space ratio in the device represented by the equation, "space ratio in the device=B/A", is in the range of 1.2 to 20. In the equation, A is a maximum cross-sectional area (cm²) of the hydropolymer during the polymerization in the width direction of the endless belt, and B is a maximum cross-sectional area (cm²) of the space between the endless belt of the continuous polymerization device and the ceiling of the continuous polymerization device in the width direction of the endless belt.

25 Claims, 7 Drawing Sheets

METHOD FOR CONTINUOUS PRODUCTION OF WATER-ABSORBENT RESIN

BACKGROUND OF THE INVENTION

1. Field of the Invention

The present invention relates to method for continuous production of a water-absorbent resin, and in particular, relates to method for production of a water-absorbent resin by continuous polymerization of a monomer contained in an aqueous solution. A water-absorbent resin obtained by a method of the present invention is effectively used as sanitary articles such as a disposable diaper and a sanitary napkin, a water retaining agent for soil, etc.

2. Description of Related Art

A water-absorbent resin is a resin with high water-absorption capacity and is adopted to wide applications making use of performance thereof. For example, a water-absorbent resin is applied to sanitary articles such as a disposable diaper and a sanitary napkin, a water retaining agent for soil, etc.

Such a water-absorbent resin (also called as a superabsorbent polymer (SAP) or a water-absorbent polymer) is described, for example, in Japanese Industrial Standards (JIS) K7223-1996 and already known. The known water-absorbent polymers include partially neutralized and crosslinked polyacrylic acid, hydrolysates of acrylic acid grafted starch, saponified products of vinyl acetate-acrylic acid ester copolymers, hydrolysates of acrylonitrile or acrylamide copolymers or crosslinked polymers thereof, crosslinked polymers of cationic monomers, etc.

The water-absorbent resin is used in a disposable diaper and a sanitary napkin or a water retaining agent for soil in relatively large amount. Therefore, it has huge influence upon cost competitiveness of a product made with a water-absorbent resin. Consequently, the development of cost reduction arts in the production of the water-absorbent resin has been desired.

To produce the water-absorbent resin by an aqueous solution polymerization, a monomer aqueous solution containing a monomer, a polymerization initiator and a crosslinking agent is prepared. Aqueous solution polymerization proceeds in the aqueous solution to obtain a gel-like hydropolymer. After disintegrating a hydropolymer, a particulate hydropolymer is dried to obtain a particulate base polymer, followed by surface crosslinking of the base polymer to obtain a water-absorbent resin.

In such processes, the huge amount of energy is required to dry a hydropolymer. Production methods are disclosed to produce a hydropolymer with low water content by using an aqueous solution with high monomer concentration (See, for example, U.S. Pat. No. 4,552,938 and U.S. Pat. No. 4,985,518). However, a water-absorbent resin produced by such disclosed methods has a problem on the performance to be solved such as the resultant water-absorbent resins have high extractable content for their water-absorption capacities. A reason for that is not clear, but it is considered that a high molecular weight component formed in early polymerization stage under high concentration may exert a bad influence upon performance.

Therefore, to enhance performance of a water-absorbent resin, polymerization arts was developed by using an aqueous solution with low monomer concentration by controlling the temperature at not higher than a certain specified level (See, for example, U.S. Pat. No. 5,380,808 and U.S. Pat. No. 6,174,978). By adopting a mild polymerization condition, it is possible to obtain a water-absorbent resin with high performance. However, due to the generation of the heat of polymerization during the polymerization reaction, heat removal is required from a polymerization reaction solution. The large heat quantity is also necessary to dry a hydropolymer with high water content. That is, arts disclosed in U.S. Pat. No. 5,380,808 and U.S. Pat. No. 6,174,978 still have a problem on production cost, although they contribute to improvement of performance of a water-absorbent resin.

As arts satisfying both production cost and quality, a polymerization method has been disclosed wherein an aqueous solution containing acrylic acid or a sodium salt thereof in high concentration is polymerized at a high initial temperature, while vaporizing water (See U.S. published application 2002-40095). By using such a method, the cost for heat removal can be reduced because heat removal during the polymerization is not required. The cost necessary for drying can also be reduced because the water content in the hydropolymer formed is low. Furthermore, the produced water-absorbent resin has high performance.

Various arts have been disclosed on a production method for a water-absorbent resin like these. However, desire for the development of an effective production method of water-absorbent resin with high performance is still present.

BRIEF SUMMARY OF THE INVENTION

An object of the present invention is to provide an effective production method for a water-absorbent resin with high performance.

The present invention provides a method for the continuous production of a water-absorbent resin by use of continuous polymerization device having a charge part of a monomer aqueous solution containing a monomer, a polymerization initiator and a crosslinking agent; an endless belt on which the monomer and a hydropolymer formed are conveyed; and a discharge part of the hydropolymer, wherein the continuous polymerization device has side walls and a ceiling, and the space ratio in the device represented by the following equation 1 is in the range of 1.2 to 20:

$$\text{Space ratio in the device} = B/A \qquad \text{[Equation 1]}$$

wherein A is a maximum cross-sectional area (cm$^2$) of the hydropolymer during the polymerization in the width direction of the endless belt, and B is a maximum cross-sectional area (cm$^2$) of the space between the endless belt of the continuous polymerization device and the ceiling of the continuous polymerization device in the width direction of the endless belt.

By using a continuous production method of the present invention, a water-absorbent resin with high performance can be continuously and effectively produced.

DETAILED DESCRIPTION OF THE INVENTION

First of all, a method for the continuous production of a water-absorbent resin of the present invention is explained briefly by referring to drawings.

Figure 1:
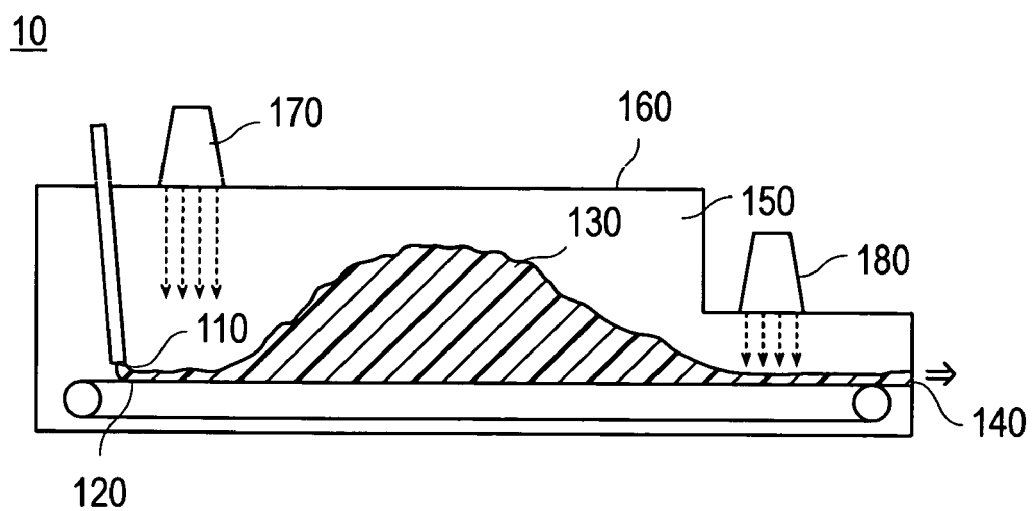
FIG. 1 is a schematic view of a continuous polymerization device used in a continuous production method of the present invention.

FIG. 1 is a schematic view of a continuous polymerization device 10 used in a continuous production method of the present invention. Incidentally, the continuous polymerization device 10 is only one embodiment of continuous polymerization device used in the present invention, and thus the technical scope of the present invention is by no means limited to the continuous polymerization device shown by FIG. 1.

First, a monomer aqueous solution containing a monomer, a polymerization initiator and a crosslinking agent is fed to an endless belt 120 through a charge part of a monomer aqueous solution 110. The endless belt 120 has movable structure and the monomer aqueous solution is conveyed with the move of the endless belt 120. Monomers are polymerized in a conveyance step on the endless belt 120, while the monomer aqueous solution vaporizing in boiling state, resulting in the generation of a foamed hydropolymer 130. The hydropolymer means a polymer formed by the polymerization of the monomer and before drying in a drying step. The hydropolymer 130 contracts, and then the hydropolymer is discharged from a discharge part 140 at the downstream side of the endless belt 120. Both sides 150 and a ceiling 160 of the continuous polymerization device are covered with a material such as a stainless steel plate, etc. The continuous polymerization device may be equipped with an ultraviolet ray irradiation unit 170 to initiate the polymerization reaction. The continuous polymerization device may be equipped with an ultraviolet ray irradiation unit 180 to remove residual monomers contained in a hydropolymer. In a method for the continuous production of the water-absorbent resin of the present invention, the polymerization conditions such as the device structure of the continuous polymerization device used and the space ratio in the device represented by equation 1 are controlled. By such controls, a water-absorbent resin with high performance is continuously produced.

In response to the property desired to a water-absorbent resin, which is finally produced by using a continuous production method of the present invention, necessary step may be added after the continuous polymerization device. For example, to obtain a surface crosslinked water-absorbent resin, a hydropolymer is conveyed to a drying step, a classifying step and a surface crosslinking step, as shown in FIG. 2.

Figure 2:
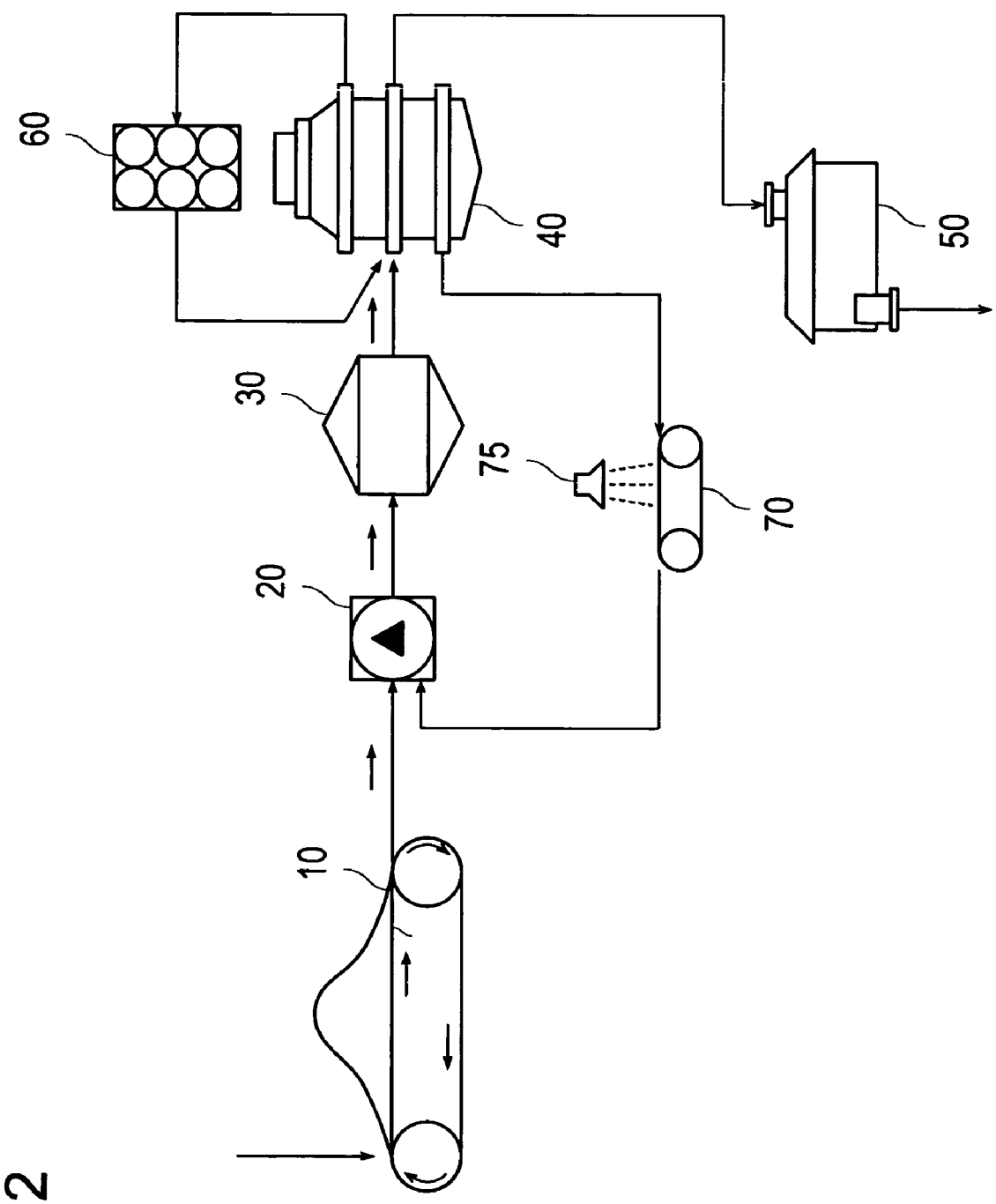
FIG. 2 is a schematic view explaining process to produce a surface crosslinked water-absorbent resin from an aqueous solution of monomer by use of a continuous polymerization device.

FIG. 2 is a schematic view explaining process to produce a surface crosslinked water-absorbent resin from an aqueous solution of monomer by use of the continuous polymerization device 10. The hydropolymer produced by using the continuous polymerization device 10 is disintegrated by a disintegrator 20 to a size suitable for drying and conveyed to a dryer 30. A base polymer generated by drying the hydropolymer is conveyed to a classifying device 40. The base polymer here means a polymer generated by drying the hydropolymer. It also means, in the case to be surface crosslinked in post step, a polymer before the surface crosslinking. The base polymer with a specified size is conveyed to a surface crosslinking device 50. The base polymer with too large size is pulverized by use of a pulverizer 60 such as a roll mill and conveyed again to the classifying device 40. The fine powder-like base polymer with too small size is conveyed to a pelletizer 70. The base polymer is pelletized by using an aqueous liquid sprayed from a sprayer 75 and conveyed to the disintegrator 20 again as the hydropolymer. In the surface crosslinking device 50, a surface crosslinked water-absorbent resin is obtained by crosslinking the base polymer by using a surface crosslinking agent. To a water-absorbent resin, which was surface crosslinked, suitable treatment for a product such as uniform sizing is added. Incidentally, the technical scope of the continuous production method of the present invention is not limited to an embodiment having post treatment steps such as shown by FIG. 2. A production method for a water-absorbent resin derived from the hydropolymer produced continuously in accordance with the description of the present invention is at least included in the technical scope of the present invention.

Next, the present invention is explained in more detail on each composition requirement.

The water-absorbent resin of the present invention means a water swelling and water insoluble crosslinked polymer, and a crosslinked polymer forming hydrogel with the property of anionic, nonionic or cationic, or two or more of them by water-absorption. "Water swelling" means to absorb a high amount of water such as not smaller than 2 times, preferably 10 to 3000 times, more preferably 50 to 2000 times, in ion exchanged water, based on its own solid content. "Water insoluble" means that an extractable content of un-crosslinked portion of the water-absorbent resin toward water is not higher than 50 wt %, preferably not higher than 25 wt %, more preferably not higher than 20 wt %, further preferably not higher than 15 wt % and particularly preferably not higher than 10 wt %. A measurement method for the extractable content is specified in Example.

The charge part 110 of the monomer aqueous solution is a part to feed the monomer aqueous solution containing a monomer, a polymerization initiator and a crosslinking agent to the endless belt 120.

The monomer used as a raw material of the water-absorbent resin in the present invention includes anionic unsaturated monomers and salts thereof such as (meth)acrylic acid, maleic acid (anhydride), itaconic acid, cinnamic acid, vinylsulfonic acid, allyl toluenesulfonic acid, vinyl toluenesulfonic acid, styrenesulfonic acid, 2-(meth)acryloylamino-2-methylpropnanesulfonic acid, 2-(meth)acryloylethanesulfonic acid, 2-(meth)acryloylpropanesulfonic acid, 2-hydroxyethyl (meth)acryloyl phosphate, etc.; mercaptane group containing unsaturated monomers; phenolic hydroxy group containing unsaturated monomers; amide group containing unsaturated monomers such as (meth)acryl amide, N-ethyl (meth)acryl amide, N,N-dimethyl (meth)acryl amide; and amino group containing unsaturated monomers such as N,N-dimethylaminoethyl (meth)acrylate, N,N-dimethylaminopropyl (meth) acrylate, N,N-dimethylaminopropyl (meth)acrylamide. The monomer may be used as it is or in combination of two or more kinds.

In consideration of water-absorption performance and cost of the water-absorbent resin, it is preferable that acrylic acid and/or a salt thereof are used as a monomer. A specified example of the salt includes sodium salt, potassium salt, ammonium salt, amine salt of acrylic acid. In view of the cost, sodium acrylate is preferably used. While other monomers may be contained, use amount of acrylic acid and/or a salt thereof is preferably not lower than 70 mol % and up to 100 mol %, more preferably not lower than 80 mol %, further preferably not lower than 90 mol % and particularly preferably not lower than 95 mol % based on total moles of the monomers.

The monomer concentration in the monomer aqueous solution fed to the endless belt is not especially limited, however, preferably not lower than 30 wt %, more preferably not lower than 35 wt %, further preferably not lower than 40 wt %, further more preferably not lower than 45 wt %, particularly preferably not lower than 50 wt % and most preferably not lower than 55 wt %. By increasing the monomer concentration, the productivity of the water-absorbent resin is improved. In the present invention, the polymerization reaction by using an aqueous solution with high monomer concentration can proceed. A water-absorbent resin with high performance can be produced by not controlling increase in the polymerization temperature by heat of the polymerization. That is different from conventional continuous polymerizations. The upper limit of the monomer concentration is also not especially limited, however, preferably not higher than 80 wt %, more preferably not higher than 70 wt % and further preferably not higher than 60 wt %. Too high monomer concentration may reduce the water-absorption capacity.

In the case of using a monomer containing an acid group, as a raw material, it may be neutralized before the polymerization. For example, in the case of using acrylic acid as a monomer, acrylic acid may be neutralized with sodium hydroxide and the like to form a salt of the acrylic acid. By neutralization of an acid group, a product can be applied to sanitary articles such as a disposable diaper and a sanitary napkin without neutralization after the polymerization. The neutralization ratio of the monomer containing an acid group is not especially limited, however, preferably not lower than 50 mol % and lower than 80 mol %, more preferably not lower than 55 mol % and higher than 78 mol % and further preferably not lower than 60 mol % and higher than 75 mol %.

In the continuous polymerization device, the polymerization reaction proceeds preferably by heating the monomer aqueous solution fed to the endless belt 120, under fierce water vaporization. Therefore, the monomer aqueous solution fed to the endless belt 120 is preferably heated in advance to a certain temperature. The heating of the monomer aqueous solution may be carried out by a heating unit such as a heater or the heat of the neutralization and/or the heat of the dissolution of acrylic acid may be utilized. In view of production cost, it is preferable to utilize the heat of the neutralization and/or the heat of the dissolution of acrylic acid.

While the polymerization initiator is not especially limited, a thermal initiator or a photoinitiator can be used. As the thermal initiators, persulfates such as sodium persulfate, potassium persulfate, ammonium persulfate, etc.; peroxides such as hydrogen peroxide, t-butyl peroxide, methyl ethyl ketone peroxide, etc.; azo compounds such as azonitrile compounds, azoamidine compounds, cyclic azoamidine compounds, azoamide compounds, alkylazo compounds, 2,2'-azobis(2-amidinopropane) dihydrochloride, 2,2'-azobis[2-(2-imidazoline-2-yl)propane]dihydrochloride, etc are included. The above peroxide may be combined with a reductant such as sulfite, bisulfite, thiosulfate, formamidinesulfinic acid, ferrous sulfate, ascorbic acid, etc. to carry out redox polymerization. As the photoinitiators, benzoin derivatives, benzyl derivatives, acetophenone derivatives, benzophenone derivatives, azo compounds, etc. are included. These polymerization initiators may be used alone or in suitable combination. In view of reduction ability of residual monomers, it is preferable to combine the thermal initiator with the photoinitiator. The amount of the polymerization initiator used is usually 0.001 to 2 mol % and preferably 0.01 to 0.5 mol % based on the total moles of the monomers.

As the crosslinking agent contained in the monomer aqueous solution, a compound with plurality of vinyl groups in a molecule; a compound with plurality of functional groups in a molecule reactable with a carboxyl group or a sulfonic acid group etc. can be used arbitrarily according to the monomer used, or property desired for water-absorbent resin.

The compound having plurality of vinyl groups in a molecule includes, for example, N,N'-methylenebis(meth)acrylamide, (poly)ethyleneglycol di(meth)acrylate, (poly)propyleneglycol di(meth)acrylate, trimethylolpropane tri(meth) acrylate, trimethylolpropane di(meth)acrylate, glycerine tri (meth)acrylate, glycerine acrylate methacrylate, ethyleneoxide modified trimethylolpropane tri(meth)acrylate, etc.

The compound having plurality of functional groups in a molecule reactable with a carboxyl group or a sulfonic acid group includes polyalcohol compounds, epoxy compounds, multivalent amine compounds, condensates of multivalent amine and haloepoxy compounds, multivalent isocyanate compounds, multivalent oxazoline compounds, alkylene carbonate compounds, haloepoxy compounds, multivalent metallic hydroxides and chlorides, etc. For example, (poly) ethylene glycol, diethylene glycol, triethylene glycol, tetraethylene glycol, propylene glycol, 1,3-propanediol, dipropylene glycol, 2,2,4-trimethyl-1,3-pentanediol, polypropylene glycol, (poly)glycerine, 2-butene-1,4-diol, 1,4-butanediol, (poly)ethylene glycol diglycidyl ether, (poly)glycerol polyglycidyl ether, diglycerol polyglycidyl ether, (poly)propylene glycol diglycidyl ether, glycidol, etc. can be used.

However, the crosslinking agent is not limited to those exemplified and known crosslinking agents can be used as appropriate. For example, U.S. Pat. No. 6,140,395 is incorporated in the present invention as a reference. The publication can be referred on other components contained in an aqueous solution. Other papers may also be used as reference.

The use amount of the crosslinking agent is not especially limited, however, preferably in the range from 0.0001 to 10 mol %, more preferably from 0.001 to 1 mol % based on the total moles of the monomers.

Other components may be contained in the monomer aqueous solution. For example, hydrophilic polymers such as starch, starch derivatives, cellulose, cellulose derivatives, polyvinyl alcohol, polyacrylic acid (salts), crosslinked polyacrylic acid (salts), etc.; chain transfer agents such as hypophosphorous acid (salt), etc.; and chelating agents may be included. When these components are included, the amount is preferred to be in the range from 0 to 30 wt % based on the total moles of the monomers. A solvent of the monomer aqueous solution is usually water. However, components other than water may be added to improve polymerization reactivity or performance of the water-absorbent resin.

The temperature of the monomer aqueous solution fed to the endless belt is preferably raised in advance. By raising the temperature of the monomer aqueous solution, dissolved oxygen in the monomer aqueous solution is removed. A high temperature of the monomer aqueous solution is also suitable to apply the continuous production method of the present invention to polymerize while vaporizing water at the high temperature.

Specifically, the temperature of the monomer aqueous solution fed to the endless belt is not lower than 10° C., preferably not lower than 50° C., more preferably not lower than 60° C., further preferably not lower than 70° C., particularly preferably not lower than 80° C. and most preferably not lower than 90° C. The upper temperature limit of the monomer aqueous solution is not especially limited, however, preferably not higher than 105° C. and more preferably not higher than 100° C. Too low temperature of the monomer aqueous solution requires too long time to raise the temperature of the monomer aqueous solution to the boiling point of water in the monomer aqueous solution and may lower productivity. It may also impair performance of the water-absorbent resin.

When the monomer containing an acid group such as acrylic acid, it is preferable to raise the temperature of the aqueous solution fed to the endless belt by utilizing the heat of the neutralization generating in the neutralization of the acid group with alkali. The temperature of the aqueous solution fed to the endless belt may also be raised by utilization of the heat of the dissolution of the monomer and the alkali. Both the heat of the neutralization and the heat of dissolution may be utilized. Dissolved oxygen in the aqueous solution can be volatilized by the heat of the neutralization and/or the heat of the dissolution.

The monomer aqueous solution is preferably stirred before feeding to the endless belt 120 to carry out uniform polymerization. A stirring method is not especially limited. For example, a static mixer can be used.

The composition or the feed amount of the monomer aqueous solution should be determined in response to the water-absorbent resin or the production device composition and not be restricted in one embodiment. For example, the feed amount of the monomer aqueous solution should be determined in response to a device size. To produce the water-absorbent resin with a uniform quality, the feed amount is preferably constant.

The endless belt 120 is preferably made of a material having corrosion resistance and durability. Further, when the polymerization reaction proceeds while vaporizing the monomer aqueous solution, it is preferably made of a heat resistant material. For example, a fluorocarbon resin such as a polytetrafluoroethylene sheet is used as the endless belt.

At near the charging port 110 of the endless belt 120 for the monomer aqueous solution, side part weirs (not shown) may be set, as fixed one so that it slides with the endless belt 120 at both sides of the endless belt 120, along the moving direction of the endless belt 120. The side part weirs prevent overflow of the monomer aqueous solution fed to the endless belt from the endless belt. When the side part weirs are set, it is preferably set to cover an area at least from the charging port 110 to the position where the monomer aqueous solution fed to the endless belt 120 initiates gelling. If the endless belt has structure to deform by the weight of the monomer aqueous solution fed to the endless belt 120, the deformation may be utilized to prevent overflow of the aqueous solution from the endless belt.

The end part weir (not shown), which slides with the endless belt 120, may be set at the upstream in the moving direction from the charging port 110 of the monomer aqueous solution in nearly orthogonally against the moving direction of the endless belt 120. The end part weir prevents the monomer aqueous solution from flowing out in the direction of the upstream side and overflowing out of the endless belt 120. The end part weir and the side part weirs may be formed separately or in one part. The continuous polymerization device may be lower at the downstream side to prevent back flow of the aqueous solution fed to the endless belt 120, depending on a case. On the side part weirs and the end part weir, known arts such as described in U.S. Pat. No. 6,241,928 may be referenced as appropriate.

In a method for the continuous production of the water-absorbent resin of the present invention, a continuous polymerization device where two sides and a ceiling are covered is used. That is, as shown in FIG. 1, the sides 150 and the ceiling 160 of the continuous polymerization device are covered with a material such as a metal plate. The sides of the continuous polymerization device mean two sides relative to the moving direction of the endless belt 120 and the ceiling of the continuous polymerization device means a surface placed at the upper direction of the endless belt 120. "The ceiling is covered" does not require to be such that contact of the hydropolymer with outer air is perfectly prevented. It is sufficient that at least the sides and the upper direction of the formed hydropolymer are covered with the side walls 150 and the ceiling 160. For example, as shown in FIG. 1, the sides and the ceiling of the endless belt are covered.

By covering the sides and the ceiling of the continuous polymerization device, the heat dissipation during the polymerization is reduced and the heat of the neutralization and the heat of the polymerization can be utilized effectively and thus the polymerization proceeds more effectively. As the result, the performance of the water-absorbent resin is improved. For example, residual monomers are reduced. By covering the ceiling and the sides of the continuous polymerization device, the vaporization of the monomer aqueous solution to exterior of the device can also be significantly reduced, which can contribute to production environment improvement. Furthermore, by covering the ceiling and the sides of the continuous polymerization device, contamination of impurity into a produced polymer can be prevented.

The material composing the side walls and the ceiling of the continuous polymerization device is not especially limited as long as it is a material difficult to deteriorate by components generated during the polymerization reaction. Preferably, it is a material with high durability to hot steam because the polymerization reaction proceeds while boiling the aqueous solution. The composing material may be determined by consideration of other components used. For example, stainless steel, reinforced glass, a tetrafluoroethylene plate, etc may be used.

The monomer aqueous solution fed to the endless belt 120 changes from liquid to a gel-like hydropolymer along with progress of the polymerization. When the photoinitiator to initiate the polymerization reaction by ultraviolet ray is compounded into the monomer aqueous solution, the polymerization is initiated by the ultraviolet ray irradiated from the ultraviolet ray irradiation unit 170. The position of the ultraviolet ray irradiation unit is not especially limited as long as it can irradiate ultraviolet ray to the solution and can promote the polymerization reaction. As shown in FIG. 1, it may be installed at the ceiling of the device. To install at the ceiling of device, a lamp may be hung from the ceiling of the device by use of a bolt and nut, or a part of the ceiling 160 of the device is opened, and the ultraviolet ray may be irradiated from the hole.

The monomers in the monomer aqueous solution are polymerized while being conveyed on the endless belt 120 and the temperature of the aqueous solution increases by the heat of the polymerization accompanied with the polymerization. The polymerization reaction of the monomers proceeds in the solution vaporizing in boiling state of water, which is heated to boiling point. As a result, the hydropolymer 130 generated in a conveyance step on the endless belt 120 expands, and the hydropolymer 130 is converted to a foamed state. In the step of foaming of the hydropolymer by expansion, the hydropolymer 130 is removed irregularly from the endless belt 120. The water contained in the hydropolymer 130 gradually vaporizes.

When the foamed hydropolymer is produced by progress of the polymerization reaction while vaporizing water, the water-absorbent resin finally obtained has high performance. It has been considered that the performance is impaired by progress of the polymerization reaction under a fierce reaction conditions, however, if the production method of the present invention is adopted, even under such condition the water-absorbent resin with equivalent quality as a water-absorbent resin produced under a mild condition can be produced. Though a reason for that is not clear, it is estimated that by adopting the production method for the foamed hydropolymer after initiating the polymerization reaction at a certain high temperature, generation of a hydropolymer with high molecular weight, which impairs performance, may be suppressed.

In methods described in U.S. Pat. No. 5,380,808 and U.S. Pat. No. 6,174,978, the temperature of the monomer aqueous solution and the monomer concentration, where the polymerization reaction proceeds, was controlled low to carry out the polymerization reaction mildly. That is, it was required to remove heat from the monomer aqueous solution, if necessary, not to increase the temperature, higher than necessary, of the monomer aqueous solution by the heat of the generated polymerization. On the other hand, the method of the present invention utilizes the heat of the polymerization to raise the temperature of the monomer aqueous solution. Therefore, the method of the present invention is superior in view of energy efficiency.

Moreover, the polymerization reaction proceeds in a sufficiently high reaction rate in the condition that the temperature of the monomer aqueous solution is high. The continuous polymerization with the endless belt is essentially superior in productivity. However, it is necessary to carry out the polymerization reaction sufficiently before the hydropolymer is recovered from the endless belt. Consequently, productivity in the continuous polymerization with endless belt depends largely on the polymerization reaction rate. For example, to sufficiently ensure a feed amount of the monomer aqueous solution to the endless belt, a wide endless belt should be used, or conveyance speed of the endless belt should be increased by using a long endless belt. However, any of such cases may bring about larger scale of the continuous polymerization device and increase in the production cost of the water-absorbent resin. When the polymerization reaction is proceeded at such a high temperature as to fiercely vaporize water in the monomer aqueous solution fed to the endless belt, the polymerization reaction rate is very high. Therefore, the polymerization is possible in such a short time level as not to be imagined in continuous polymerization with a conventional endless belt, and it dramatically improves productivity of the water-absorbent resin.

When the foam polymerization is carried out by use of the endless belt, a gel sheet, composed of a gel-like hydropolymer, can be made thick. When the foam polymerization is implemented by a batch polymerization, it is difficult to obtain a thick gel sheet because of free expansion to any direction. On the other hand, in the continuous polymerization with the endless belt to convey on, expansion to the moving direction is restricted, resulting in only upward expansion to obtain a thick gel sheet. This in turn improves productivity further.

When the water-absorbent resin is produced by the continuous polymerization with the endless belt, an effect on the quality of the water-absorbent resin is also attained surprisingly. When the water-absorbent resin is produced by the batch polymerization, residual monomers in the water-absorbent resin increase because of the presence of the walls of the polymerization device where many monomers adhere, resulting in reattachment of these monomers to gel formed. On the other hand, when the continuous polymerization with the endless belt is adopted, walls are not present in the moving direction, although walls are present at both sides of the polymerization device. This is estimated to bring about less residual monomers reattaching to the hydropolymer.

The polymerization reaction is usually carried out under a normal pressure but a reduced pressure may be adopted to decrease boiling point of the polymerization system. Preferably, the polymerization reaction is carried out under a normal pressure in view of workability.

The initial temperature of the polymerization is usually not lower than 30° C., preferably not lower than 50° C., more preferably not lower than 60° C., further preferably not lower than 70° C., particularly preferably not lower than 80° C. and most preferably not lower than 90° C. Too low initial temperature can decrease productivity of the polymerization and may impair the performance of the water-absorbent resin. Further, the initial temperature of the polymerization is preferably not higher than 105° C. and more preferably not higher than 100° C. When initial temperature is too high, foaming and extension do not happen enough, and may impair the performance of the water-absorbent resin. The initial temperature of the polymerization can be observed by white turbidity of the monomer aqueous solution, viscosity increase, temperature increase, etc.

The maximum temperature during the polymerization is not especially limited, however, preferably not higher than 150° C., more preferably not higher than 140° C., further preferably not higher than 130° C., particularly preferably not higher than 120° C. and most preferably not higher than 115° C. If this maximum temperature is over 150° C., the water absorbability of a water-absorbent resin obtained may largely decrease.

In the present invention, the difference between the initial temperature of the polymerization and the maximum temperature during the polymerization, $\Delta T$, is preferably not larger than 70° C., more preferably not larger than 60° C., further preferably not larger than 50° C., further more preferably not larger than 40° C., particularly preferably not larger than 30° C. and most preferably not larger than 25° C. Smaller $\Delta T$ tends to invite more improved performance of the water-absorbent resin obtained.

In a preferable embodiment, the temperature in the system abruptly increases after the polymerization initiation to reach to the boiling temperature of water at low polymerization degree of about 10 to 20 mol %. Then, the polymerization proceeds while emitting steam and increasing solid content. The heat of the polymerization is effectively utilized to increase solid content.

The polymerization time is not especially limited, however, preferably not longer than 5 minutes, more preferably not longer than 3 minutes, further preferably not longer than 2 minutes and particularly preferably not longer than 1 minute. Shorter polymerization time more improves productivity of the polymerization reaction. The polymerization time here means from time when the monomer aqueous solution added with the polymerization initiator is fed to the continuous polymerization device till time when the hydropolymer is discharged from the continuous polymerization device.

The solid content of the hydropolymer gradually increases with progress of the polymerization reaction. The hydropolymer produced by a production method of the present invention has high solid content, therefore requires less energy to dry the hydropolymer in a post drying step. In view of enhancing this effect, the solid content of the hydropolymer is preferably not lower than 50 wt %, more preferably not lower than 55 wt %, further preferably not lower than 60 wt % and particularly preferably not lower than 66 wt %. Too high solid content may provides handling difficulty of the hydropolymer. Further, the water absorbability of the water-absorbent resin finally obtained tends to decrease and the extractable content increased. Therefore, the solid content of the hydropolymer is controlled to preferably not higher than 82 wt %, more preferably not higher than 80 wt %, and further preferably not higher than 75 wt %.

In the present invention, a relation between the hydropolymer and the device size is regulated. That is, in the continuous production method of the present invention, the space ratio in the device represented by the following equation 1 is in the range of 1.2 to 20:

$$\text{Space ratio in the device} = B/A \quad \text{[Equation 1]}$$

Figure 3:
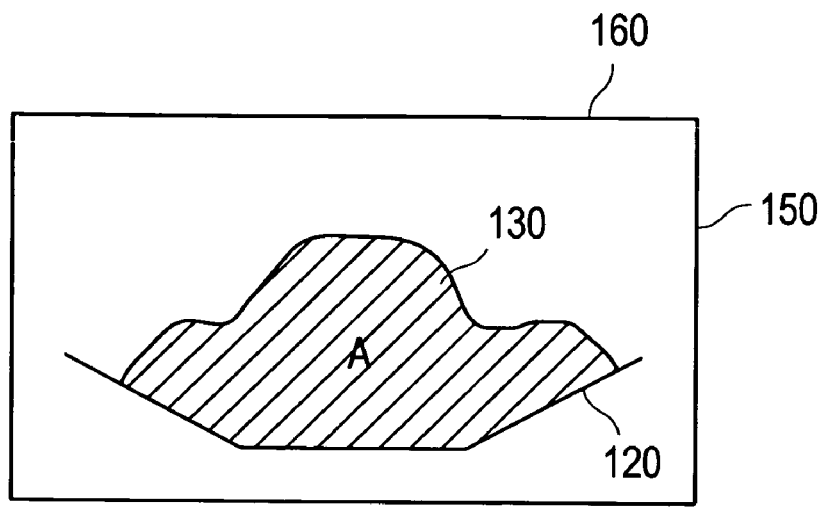
FIG. 3 is a cross-sectional view of the width direction of an endless belt of the continuous polymerization device in which a hydropolymer is conveyed. A part shown by oblique lines corresponds to [A].

In the equation, A is a maximum cross-sectional area ($cm^2$) of the hydropolymer during the polymerization in the width direction of the endless belt. FIG. 3 is a cross-sectional view in the width direction of the endless belt of the continuous polymerization device on which hydropolymer is conveyed. When the cross-section in the vertical direction toward the moving direction of the endless belt is imagined, as shown in FIG. 3, an expanded hydropolymer 130 is present on the endless belt 120. In FIG. 3, an oblique line part is a cross-sectional area of the hydropolymer. While the cross-sectional area of the hydropolymer varies depending on an observation part, the maximum cross-section among them corresponds to "A" in equation 1. The cross-sectional area of the hydropolymer can be measured by taking a video image of the hydropolymer during the polymerization and reading from them the cross-sectional area in the width direction of the endless belt at the time of the maximum expansion. Other methods may be adopted as long as a certain level of accurate value can be calculated.

Figure 4:
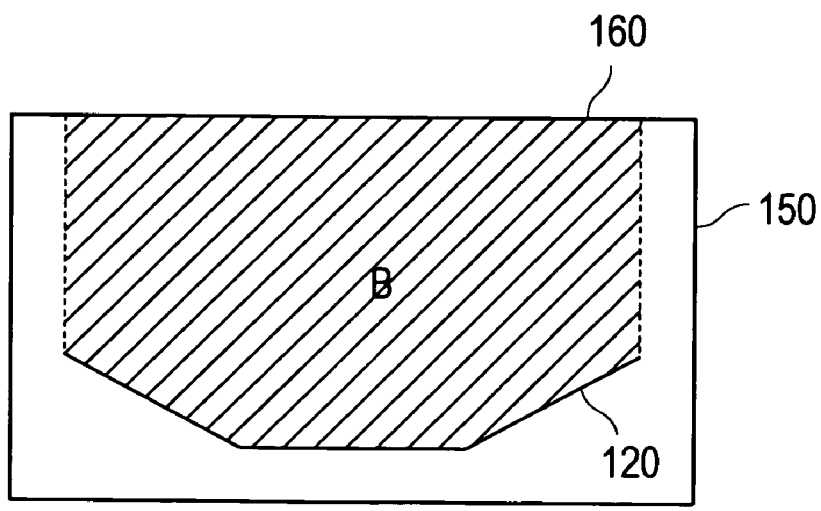
FIG. 4 is a cross-sectional view of the width direction of an endless belt of a continuous polymerization device in which a hydropolymer is not conveyed. A part shown by oblique lines corresponds to [B].

In equation 1, "B" ($cm^2$) is a maximum cross-sectional area, in the width direction of the endless belt, of the space between the endless belt of the continuous polymerization device and the ceiling of the continuous polymerization device. FIG. 4 is a cross-sectional view in the width direction of the endless belt of the continuous polymerization device on which the hydropolymer is not conveyed. A part shown by oblique line, as shown in FIG. 4, corresponds to the cross-sectional area of the space between the endless belt 120 and the ceiling 160. While the cross-sectional area varies depending on an observation part, the maximum cross-sectional area among them corresponds to "B" in equation 1.

The polymerization reaction proceeds so that the space ratio in the device calculated by the "A" and "B" is in the range from 1.2 to 20. When the polymerization reaction proceeds under such a space ratio, the heat dissipation during the polymerization is reduced and the heat of the neutralization and the heat of the polymerization can effectively be utilized to carry out the polymerization effectively. Therefore, the performance of the water-absorbent resin is improved, such as lower residual monomers. When the space ratio in the device is within the above ratio range, air flow passage in the continuous polymerization device can be secured to make it easy to recover water and/or the monomers vaporized during the polymerization. Furthermore, when the space ratio in the device is within the above ratio range, such event can be avoided as a hydropolymer formed attaches to the sides or the ceiling of the continuous polymerization device, which causes increase in the residual monomers or inability to produce the continuous production by failure to convey the hydropolymer. The space ratio in the device lower than 1.2 may cause attachment of the hydropolymer to the sides or the ceiling of the continuous polymerization device, and thus raise problems such as a large amount of residual monomers or inability to produce the continuous production by failure to convey the hydropolymer. Further, the air flow passage in the continuous polymerization device may be narrow to make it difficult to recover the vaporized water or monomers, and may cause increase in residual monomers or decrease in solid content in the polymer. On the contrary, when the space ratio in the device is larger than 20, heat dissipation is increased and the heat of the neutralization and the heat of the polymerization can not be utilized effectively, which may results in lowered performance of the water-absorbent resin, for example increase in residual monomers.

The relation between the hydropolymer and the amount of the charged monomer aqueous solution preferably satisfies the following condition. That is, the polymerization reaction is controlled so that the expansion ratio of the hydropolymer represented by the following equation 2 is in the range of 2 to 500:

$$\text{Expansion ratio of the hydropolymer} = A/C \quad \text{[Equation 2]}$$

Figure 5:
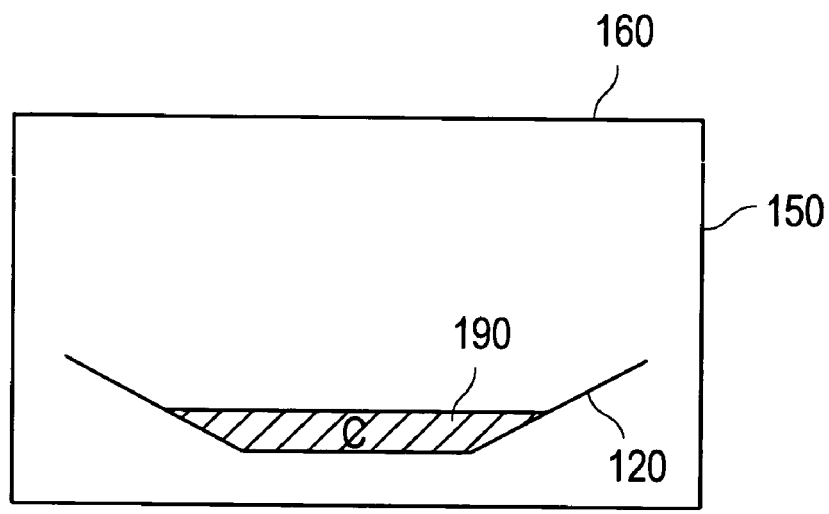
FIG. 5 is a cross-sectional view of the width direction of an endless belt of a continuous polymerization device to which a monomer aqueous solution is fed. A part shown by oblique lines corresponds to "C".

In the equation 2, "A" is the same as "A" in equation 1, therefore explanation is omitted here; and "C" is a cross-sectional area ($cm^2$) of the charged monomer aqueous solution in the width direction of the endless belt. FIG. 5 is a cross-sectional view in the width direction of the endless belt of continuous polymerization device to which the monomer aqueous solution is fed. When the cross-section area in the vertical direction toward the moving direction of the endless belt is imagined, as shown in FIG. 5, the monomer aqueous solution 190 before polymerization initiation is present at the surface of the endless belt 120. In FIG. 5, a part shown by oblique lines corresponds to the cross-sectional area of the charged monomer aqueous solution. The cross-sectional area of the charged monomer aqueous solution to the endless belt 120 can be calculated from amount of the charged monomer aqueous solution to the endless belt 120 and conveyance speed of the endless belt 120.

When the expansion ratio of the hydropolymer represented by equation 2 is too small, thermal degradation during the polymerization can occur significantly and it tends to impair performance of the water-absorbent resin, for example increased extractable content toward the water-absorption capacity of the resultant water-absorbent resin. On the other hand, too high expansion ratio of the hydropolymer can require a larger scale of the continuous polymerization device and raises the production cost. By adjustment of the expansion ratio of the hydropolymer in the range from 2 to 500, it is possible to produce the water-absorbent resin with high performance in low cost.

The relation between the amount of the charged monomer aqueous solution and the device height preferably satisfies the following condition. That is, the polymerization reaction is controlled so that the height ratio of the device represented by the following equation 3 is in the range of 10 to 500 at 90% or more of the polymerization zone:

$$\text{Height ratio of the device} = E/D \qquad \text{[Equation 3]}$$

"Polymerization zone" means the zone from the charge part of the monomer aqueous solution to the discharge part of the hydropolymer.

Figure 6:
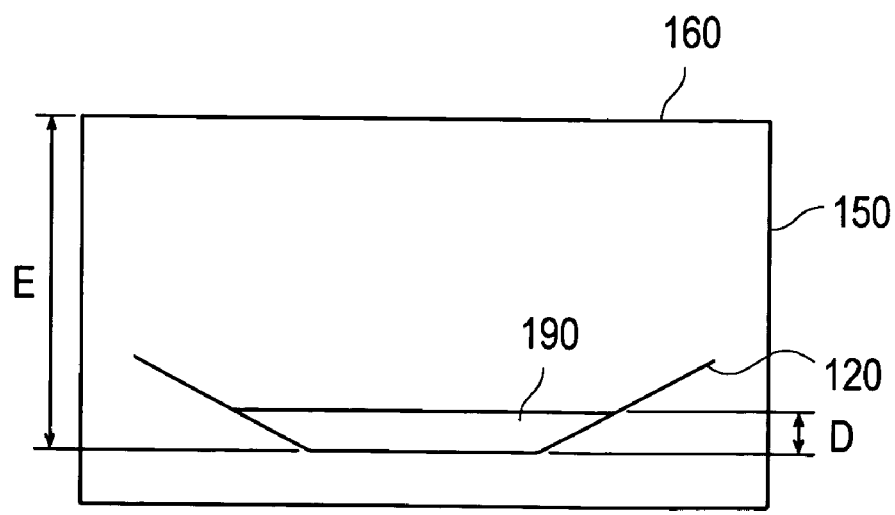
FIG. 6 is a cross-sectional view of the width direction of an endless belt of a continuous polymerization device to which a monomer aqueous solution is fed. Parts shown by arrow correspond to "D" and "E".

In the equation 3, "D" is a thickness (cm) of the charged monomer aqueous solution. FIG. 6 is a cross-sectional view in the width direction of the endless belt of the continuous polymerization device to which the monomer aqueous solution is fed. When the cross-section vertical toward the moving direction of the endless belt is imagined, as shown in FIG. 6, the monomer aqueous solution 190 before polymerization initiation is present at the surface of the endless belt 120. The thickness of the charged monomer aqueous solution means the thickness of the monomer aqueous solution fed to the endless belt. In FIG. 6, length shown by "D" is the thickness of the charged monomer aqueous solution. The thickness of the charged monomer aqueous solution varies in response to shape of the endless belt. For example, as shown in FIG. 6, when the side parts are elevated compared with a center part, the thickness at the center part becomes higher. In such a case, value at a part with the highest thickness is adopted as "D" value. "D" value can be controlled by feed an amount of the monomer aqueous solution.

In equation 3, "E" is the maximum height (cm) from the endless belt to the ceiling of the continuous polymerization device. In FIG. 6, length shown by "E" is the maximum height from the endless belt to the ceiling of the continuous polymerization device. When the endless belt is bent or folded, the height between the endless belt and the ceiling can differ in response to the position of the endless belt. In such a case, the value at the place where the maximum height between the endless belt and the ceiling of the continuous polymerization device is highest is adopted as "E" value. For example, when the ceiling is horizontal as shown in FIG. 6, the height from the lowest position of the endless belt corresponds to "E". The device height "E" may change in the moving direction of the endless belt. For example, as shown in FIG. 1, when the ceiling is low at a position near the discharge part 140 of the hydropolymer, the device height "E" becomes low there accordingly. Therefore, the height ratio of the device is also becomes small.

When the height ratio of the device represented by equation 3 is too small, the hydropolymer may attach partially at the ceiling of polymerization device, which may result in increases in the residual monomers or inability to operate the continuous polymerization due to failure of the conveyance of the hydropolymer. In addition to such defect, it may narrow the air flow passage in the continuous polymerization device and make it difficult to recover the vaporized water or monomers, which may result in the increased residual monomers or the low solid content of the hydropolymer. Furthermore, when ultraviolet ray is irradiated, the hydropolymer may be deteriorated due to the heat generated by the ultraviolet ray irradiation unit because of too small gap between the hydropolymer and the ultraviolet ray irradiation unit, or it may require installing many ultraviolet ray irradiation unit s due to reduced irradiation area of ultraviolet ray, which may increase production cost. In contrary, when the height ratio of the device is too large, the heat dissipation may increase and that impairs effective utilization of the heat of the neutralization and the heat of the polymerization, which results in the increased residual monomers and may decrease performance of the water-absorbent resin. Furthermore, when ultraviolet ray is irradiated, intensity of the ultraviolet ray reaching to the hydropolymer decreased and thus it requires installing an ultraviolet ray irradiation unit with high output power to irradiate ultraviolet ray with suitable intensity, which may raise production cost. By adjusting the height ratio of the device represented by equation 3 within the above range, these problems can be cleared.

The height ratio of the device represented by equation 3 may not be constant and preferably changes in the moving direction of the endless belt. By changing the height ratio of the device in the moving direction of the endless belt, it becomes possible to recover the vaporized water or monomers, to avoid hydropolymer attachment to the ceiling, to make compact sizing of the production device and to irradiate ultraviolet ray with suitable intensity. For example, the height ratio of the device at the charge part of the monomer aqueous solution is larger than the height ratio of the device at the discharge part of the hydropolymer. By making the height ratio of the device large at section where the hydropolymer is largely expanding (first half of the polymerization device), recovery of the vaporized water or monomers and avoidance of the hydropolymer attachment to the ceiling can be made easy. On the contrary, by making the height ratio of the device small at section where the hydropolymer is contracting (latter half of the polymerization device), compact sizing of the production device and irradiation of ultraviolet ray with suitable intensity can be realized.

At the ceiling of the continuous polymerization device, the ultraviolet ray irradiation unit may be installed. The ultraviolet ray irradiation unit may be installed to irradiate ultraviolet ray to the monomer aqueous solution containing a photoinitiator to stably initiate the polymerization reaction or to irradiate ultraviolet ray to the hydropolymer to reduce residual monomers. The ultraviolet ray irradiation unit may be installed at two or more sections to attain both objectives.

The ultraviolet ray irradiation unit uses, for example a UV lamp. The installment position of the ultraviolet ray irradiation unit to reduce the residual monomers is not especially limited as long as it can irradiate ultraviolet ray to the hydropolymer 130 to react with the residual monomers and reduce the content thereof. As shown in FIG. 1, it may be installed at the ceiling 160 of the continuous polymerization device. To install at the ceiling of the device, a lamp may be hung from the ceiling of the device by use of a bolt and nut, or a part of the ceiling of the device is opened, and a lamp may be set so that ultraviolet ray may be irradiated from the hole. The number of the installed ultraviolet ray irradiation unit or intensity of irradiation ray is not especially limited. For example, the number of installation or intensity may be increased in the case that the removal of the residual monomers is strongly desired.

Preferably, the ultraviolet ray irradiation unit is installed only at a necessary position. For example, as shown in FIG. 1, the ultraviolet ray irradiation unit is not installed between the ultraviolet ray irradiation unit 170 to initiate the polymerization and the ultraviolet ray irradiation unit 180 to reduce the residual monomers. In largely expanded state of the hydropolymer, ultraviolet ray does not reach to a lower portion of the hydropolymer and irradiated ultraviolet ray is not effectively utilized. Furthermore, when the hydropolymer is too near to the ultraviolet ray irradiation unit, the hydropolymer has high risk to be deteriorated by heat irradiated by the ultraviolet ray irradiation unit. Therefore, the ultraviolet ray irradiation unit is preferred not to be installed at an area where the hydropolymer is largely expanded, and it is also preferred that the ultraviolet ray irradiation unit are intermittently installed. By such improvement, production cost can be reduced and risk of the hydropolymer deterioration by heat irradiated from the ultraviolet ray irradiation unit can be avoided.

Also preferably, at least a part of the ceiling 160 of the continuous polymerization device is movable in the direction of the height. That is, the height of the ceiling 160 of the continuous polymerization device can be changed. More preferably, the height of a part of the ceiling where the ultraviolet ray irradiation unit is installed can be changed. Depending on a polymer produced, the expansion ratio of the hydropolymer or the suitable intensity of ultraviolet ray differs. By making the ceiling height changeable, a problem of the polymer attachment to the ceiling can be avoided and the intensity of ultraviolet ray can be adjusted. Therefore, a suitable height condition can be chosen in response to the polymerization reaction. In addition, a flexible response is possible to change in a production condition such as production amount increase.

Figure 7:
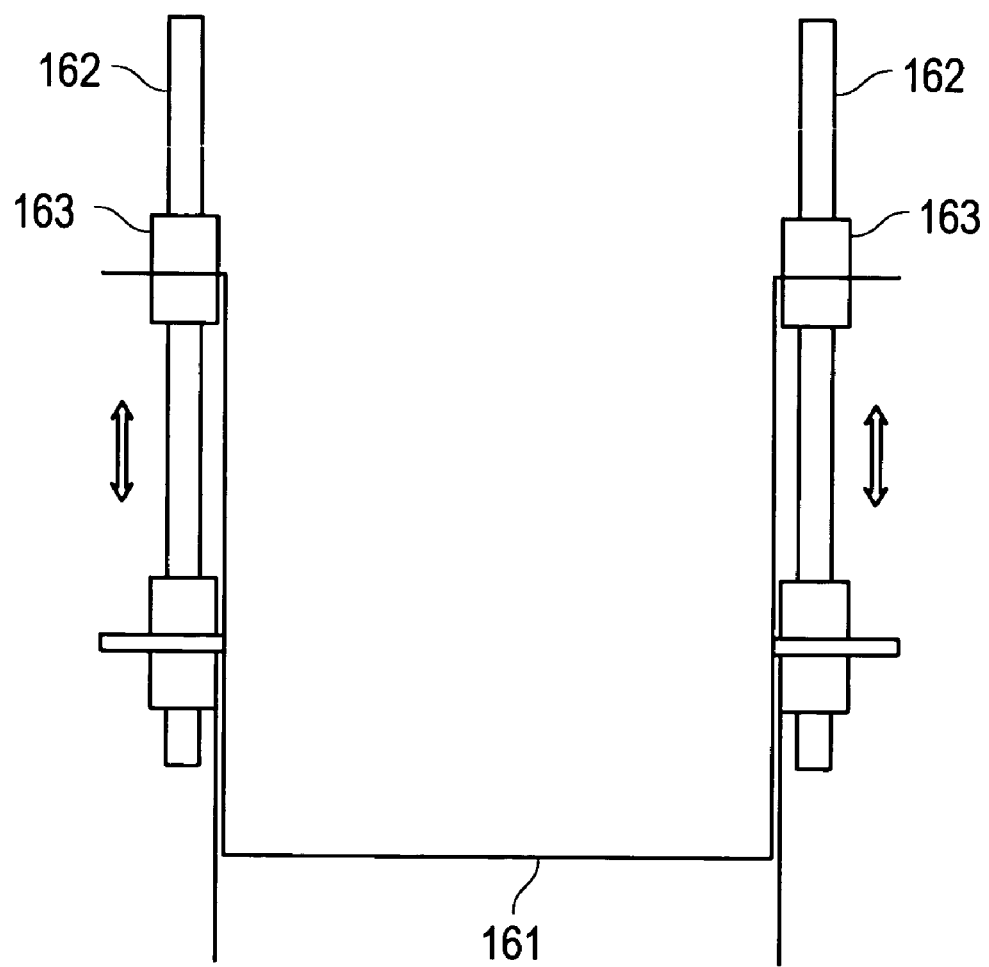
FIG. 7 is a schematic view of a screw type lift mechanism to change the height of a ceiling.

Means to change the height of the ceiling of the continuous polymerization device is not especially limited. A mechanism shown in FIG. 7 is given as a suitable example. FIG. 7 is a schematic view of screw type lift mechanism to change the height of the ceiling. The frame 161 including the ceiling of the device can go up and down by rotation of an adjustment nut 163 screwed into an adjusting helical axis 162 installed vertically against the frame.

By installing a unit to recover the vaporized water and/or acrylic acid during the polymerization to reuse, at the ceiling or the side walls of the continuous polymerization device, the reuse of water or acrylic acid may be carried out. Steam discharged from the polymerization system may contain monomers. Steam containing monomers can be recovered and reused. To recover and reuse the steam containing monomers, a hole is set at the ceiling 160 of the device to recover the steam, through which the steam can be recovered via piping (not shown). Other means may also be used naturally. The recovered steam is condensed by a condenser to form the monomer aqueous solution. After adjustment of the concentration, the monomer aqueous solution can be fed again to the continuous polymerization device via monomer feed means.

The water content in the hydropolymer gradually lowers with proceed of the endless belt 120. As shown in FIG. 1, with proceed of the endless belt 120, water vaporization from the hydropolymer 130 also gradually becomes mild and the foamed hydropolymer 130 gradually contracts.

The hydropolymer conveyed on the endless belt 120 is discharged from the discharge part of the hydropolymer positioned at the downstream part of the endless belt to the outside of the continuous polymerization device. The shape or mechanism of the discharge part 140 of the hydropolymer is not especially limited as long as it can discharge the hydropolymer. As a recovery mechanism of the hydropolymer, a winding roller may be used. The hydropolymer may be conveyed to a disintegrator continuously from the continuous polymerization device or may be conveyed to a disintegrator after cutting to a specified size.

By using the polymerization method for foaming, while vaporizing water in the monomer aqueous solution, the hydropolymer formed on the endless belt 120 becomes the foamed polymer, and the contact area between the endless belt 120 and the foamed polymer becomes small. Therefore, the hydropolymer 130 can be removed easily from the endless belt 120 and can reduce labor needed for recovery. In view of the continuous production of the hydropolymer, such merit is large. Furthermore, product quality deterioration, caused by residue of a not recovered hydropolymer on the endless belt 120, can be prevented.

In the present invention, the hydropolymer generated is the foamed polymer and thus adhesive force between the hydropolymer and the endless belt is naturally weakened during the polymerization step. Therefore, even if the endless belt is flat, the hydropolymer can be easily removed from the endless belt. The hydropolymer is removed not continuously from a side part but irregularly removed because adhesion force between the endless belt and the hydropolymer is weakened as a whole during the foaming step. "Removed irregularly" here means irregular removal at multiple places. For example, removal that proceeds gradually from a side is not concluded within the concept of "removed irregularly". On the other hand, the removal occurs between the endless belt and the hydropolymer at many places irregularly is concluded within the concept of "irregularly delaminated". Incidentally, in some cases, the endless belt may be bent in concave shape. For example the endless belt may be bent in concave shape by own weight.

Post steps after conveyance to a disintegrator may be carried out in reference to conventionally known devices and conditions. For example, U.S. published application 2002-40095 or U.S. Pat. No. 6,140,395 is incorporated herein as reference.

The hydropolymer after the polymerization may be used as is, or added with an additive. Optionally, figuration such as cutting, disintegration and/or drying can be added to the hydropolymer. Preferably, the hydropolymer is formed into a particulate base polymer by disintegration followed by drying and pulverization. The drying temperature (the temperature of heating medium) is preferably at the range of 60-230° C., more preferably at the range of 165-200° C. in consideration of the performance of the water-absorbent resin. The drying time is preferably at the range of 1-60 min. The preferred embodiment of drying is hot-air drying.

The pulverization after drying is conducted so as to obtain a particulate base polymer preferably with the particle diameter of 10-2000 μm, more preferably 100-1000 μm, still more preferably 300-600 μm. In the most preferable embodiment, the content of the water-absorbent resin with the particle diameter of less than 150 μm is controlled at the range of 0-10 wt %. Incidentally, the "particle diameter" here means weight average particle diameter, which is regulated at the sieve classification section of the Japan Industrial Standard.

The surface crosslinking (secondary crosslinking) can be conducted toward the particulate hydropolymer before drying or the base polymer after drying to form water-absorbent resin particulate. The additives such as chelating agent, oxidizing agent, reducing agent, or deodorant can be used for the improvement of property. The amount of the additives is, for example, 0-10 wt % based on the weight of the water-absorbent resin.

The water-absorbent resin and the hydropolymer of the present invention can be widely applied for various known usage including sanitary articles (disposable diaper, napkin), agriculture, gardening, civil engineering, and construction.

EXAMPLES

Example 1

Figure 8:
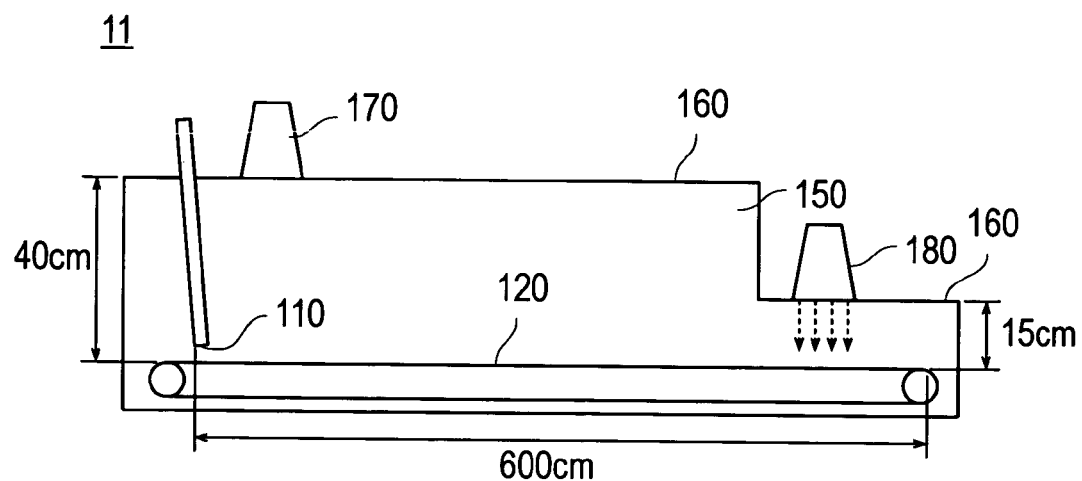
FIG. 8 is a schematic view of a continuous polymerization device used in Example 1, Comparative Example 2 and Comparative Example 3.

The polymerization was carried out by using the continuous polymerization device 11 shown by FIG. 8. As the endless belt 120, a belt having effective length of 600 cm, defined as distance from the charge part 110 of the monomer aqueous solution to the downstream end of the endless belt 120, the total belt width of 50 cm, the belt bottom surface width of 20 cm and the trough angle of 10°, and coated with a fluorocarbon resin on a glass fiber substrate was used. The continuous polymerization device was covered with the side walls 150 and the ceiling 160, and the height from the endless belt 120 at the upstream side to the ceiling 160 was 40 cm and height from the endless belt 120 at the downstream side to the ceiling 160 was 15 cm.

A monomer aqueous solution was prepared by continuously feeding to a mixer and mixing, under flow rate set as follows: 48.5 wt % of sodium hydroxide aqueous solution at 23.1 g/sec, acrylic acid at 28.4 g/sec, 30 wt % of polyethylene glycol diacrylate (number average molecular weight: 523) aqueous solution (I) at 0.314 g/sec, solution (II) of 20 wt % of acrylic acid aqueous solution 97.9 parts by weight dissolved with 2-hydroxymethyl-2-methylpropiophenone 0.989 part by weight and diethylenetriamine pentaacetic acid three sodium salts 1.08 parts by weight at 0.354 g/sec and water at 24.5 g/sec. The temperature of the monomer aqueous solution at this time was 98° C. To this monomer aqueous solution, 3 wt % of sodium persulfate aqueous solution was further added at 1.07 g/sec, and then the monomer aqueous solution was fed to the endless belt running at 400 cm/min, and maintained at about 100° C. The monomer aqueous solution was fed continuously so that the thickness "D" of the charged monomer aqueous solution was 0.49 cm and the width of the charged monomer aqueous solution was 20 cm. The height ratio of the device (E/D) was 82 and 31 at the former portion and the latter portion, respectively.

To the monomer aqueous solution fed to the endless belt, ultraviolet ray of light energy of 5 mJ/cm$^2$ was irradiated from the ultraviolet ray irradiation unit 170 (Model MT-4020 from Toshiba Light and Technology Corporation) installed at the ceiling of the continuous polymerization device, which results in the rapid polymerization and the expansion while emitting steam. At the maximum expansion, the expansion ratio of the hydropolymer (A/C) was 64 and the space ratio in the device (B/A) was 3.1. Thus expanded hydropolymer contacted in about 1 minute after the polymerization initiation. To this contracted hydropolymer, ultraviolet ray of light energy of 110 mJ/cm$^2$ was irradiated from the ultraviolet ray irradiation unit 180 (Model VB15201BY from Ushio Inc.) installed at the ceiling of the continuous polymerization device. A gel sheet made of the gel-like hydropolymer was recovered at the endless belt end, followed by introducing to a meat chopper through a discharge part to cut to pieces continuously. The cut hydropolymer was dried for 40 minutes by use of a hot air dryer controlled at 180° C., then pulverized by a portable pulverizer. Then the pulverized material was classified by use of a screen having 600 μm and 300 μm mesh to obtain a base polymer (1) having a particle diameter of 300 to 600 μm in most portion. The polymerization conditions and properties of the base polymer are summarized in Table 1.

Example 2

Figure 9:
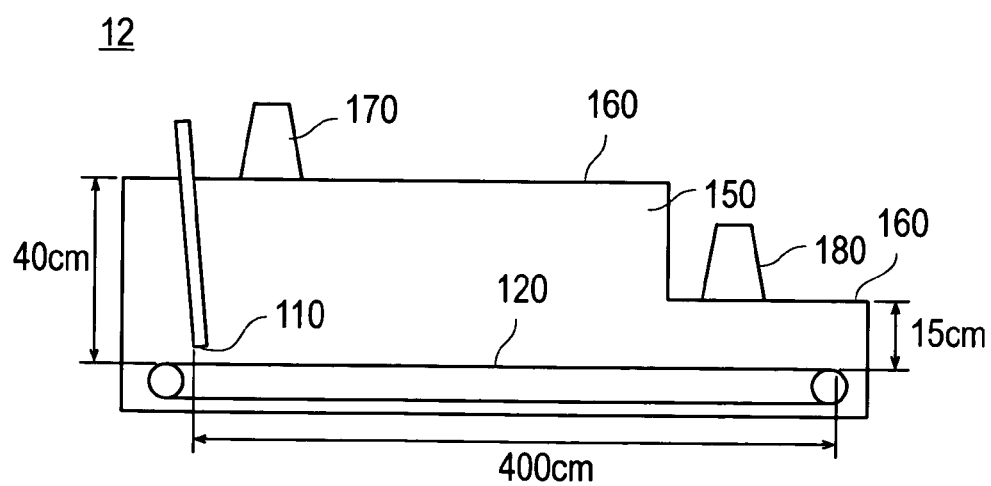
FIG. 9 is a schematic view of a continuous polymerization device used in Example 2.

The polymerization was carried out by using the continuous polymerization device 12 shown by FIG. 9. As the endless belt 120, a belt, having effective length of 400 cm, defined as distance from a charge part 110 of the monomer aqueous solution to the downstream end of the endless belt 120, the total belt width of 50 cm, the belt bottom surface width of 10 cm and the trough angle of 10°, and coated with a fluorocarbon resin on a glass fiber substrate was used. The continuous polymerization device was covered with the side walls 150 and the ceiling 160, and the height from the endless belt 120 at the upstream side to the ceiling 160 was 40 cm and the height from the endless belt 120 at the downstream side to the ceiling 160 was 15 cm.

A monomer aqueous solution was prepared by continuously feeding to a mixer and mixing, under flow rate set as follows: 48.5 wt % of sodium hydroxide aqueous solution at 8.25 g/sec, acrylic acid at 10.2 g/sec, 30 wt % of polyethylene glycol diacrylate (number average molecular weight: 523) aqueous solution(I) at 0.112 g/sec; solution(II) of 20 wt % of acrylic acid aqueous solution 97.9 parts by weight dissolved with 2-hydroxymethyl-2-methylpropiophenone 0.989 part by weight and diethylenetriamine pentaacetic acid three sodium salts 1.08 parts by weight at 0.126 g/sec and water at 8.75 g/sec. The temperature of the monomer aqueous solution at this time was 96° C. To this monomer aqueous solution, 3 wt % of sodium persulfate aqueous solution was further added at 0.381 g/sec, and then the monomer aqueous solution was fed to the endless belt running at 250 cm/min. and maintained at about 100° C. The monomer aqueous solution was fed continuously so that the thickness "D" of the charged monomer aqueous solution was 0.57 cm and the width of the charged monomer aqueous solution was 10 cm. The height ratio of the device (E/D) was 70 and 26 at the former portion and the latter portion respectively.

To the monomer aqueous solution fed to the endless belt, ultraviolet ray of light energy of 8 mJ/cm$^2$ was irradiated from ultraviolet ray irradiation unit 170 (Model MT-4020 from Toshiba Light and Technology Corporation) installed at the ceiling of the continuous polymerization device, which results in the rapid polymerization and the expansion while emitting steam. At the maximum expansion, the expansion ratio of the hydropolymer (A/C) was 41 and the space ratio in the device (B/A) was 8.1. Thus expanded hydropolymer contacted in about 1 minute after the polymerization initiation. To this contracted hydropolymer, ultraviolet ray of light energy of 170 mJ/cm$^2$ was irradiated from the ultraviolet ray irradiation unit 180 (Model VB15201BY from Ushio Inc.) installed at the ceiling of the continuous polymerization device. A gel sheet made of the gel-like hydropolymer was recovered at the endless belt end, followed by introducing to a meat chopper through a discharge part to cut to pieces continuously. The cut hydropolymer was dried for 40 minutes by use of a hot air dryer controlled at 180° C., then pulverized by a portable pulverizer. Then the pulverized material was classified by use of a screen having 600 μm and 300 μm mesh to obtain a base polymer (2) having a particle diameter of 300 to 600 μm in most portion. The polymerization conditions and the properties of the base polymer are summarized in Table 1.

Example 3

Figure 10:
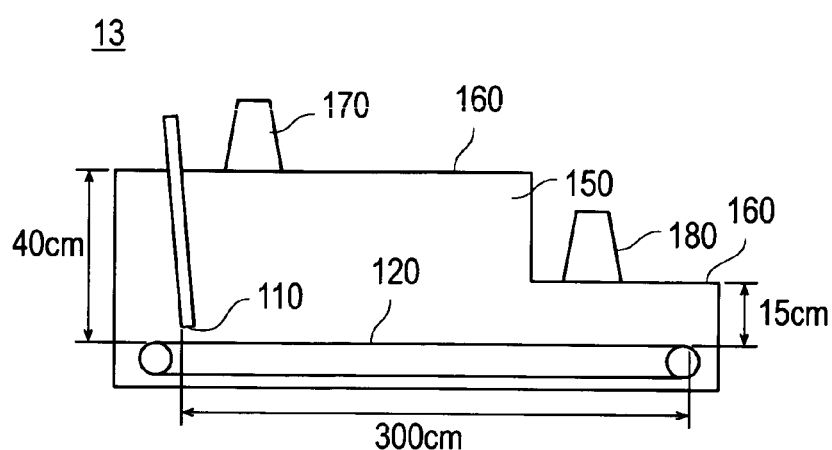
FIG. 10 is a schematic view of a continuous polymerization device used in Example 3.

The polymerization was carried out by using the continuous polymerization device 13 shown by FIG. 10. As the endless belt 120, a belt, having effective length of 300 cm, defined as distance from the charge part 110 of the monomer aqueous solution to the downstream end of the endless belt 120, the total belt width of 50 cm, the belt bottom surface width of 10 cm and the trough angle of 10°, and coated with a fluorocarbon resin on a glass fiber substrate was used. The continuous polymerization device was covered with the side walls 150 and the ceiling 160, and the height from the endless belt 120 at the upstream side to the ceiling 160 was 40 cm and the height from the endless belt 120 at the downstream side to the ceiling 160 was 15 cm.

A monomer aqueous solution was prepared by continuously feeding to a mixer and mixing, under flow rate set as follows: 48.5 wt % of sodium hydroxide aqueous solution at 4.95 g/sec, acrylic acid at 6.10 g/sec, 30 wt % of polyethylene glycol diacrylate (number average molecular weight: 523) aqueous solution(I) at 0.0672 g/sec; solution(II) of 20 wt % of acrylic acid aqueous solution 97.9 parts by weight dissolved with 2-hydroxymethyl-2-methylpropiophenone 0.989 part by weight and diethylenetriamine pentaacetic acid three sodium salts 1.08 parts by weight at 0.0758 g/sec and water at 5.25 g/sec. The temperature of the monomer aqueous solution at this time was 95° C. To this monomer aqueous solution, 3 wt % of sodium persulfate aqueous solution was further added at 0.229 g/sec, and then the monomer aqueous solution was fed to the endless belt running at 200 cm/min. and maintained at about 100° C. The monomer aqueous solution was fed continuously so that the thickness "D" of the charged monomer aqueous solution was 0.42 cm and the width of the charged monomer aqueous solution was 10 cm. The height ratio of the device (E/D) was 95 and 36 at the former portion and the latter portion respectively.

To the monomer aqueous solution fed to the endless belt, ultraviolet ray of light energy of 10 mJ/cm$^2$ was irradiated from ultraviolet ray irradiation unit 170 (Model MT-4020 from Toshiba Light and Technology Corporation) installed at the ceiling of the continuous polymerization device, which results in the rapid polymerization and the expansion while emitting steam. At the maximum expansion, the expansion ratio of the hydropolymer (A/C) was 28 and the space ratio in the device (B/A) was 16. Thus expanded hydropolymer contacted in about 1 minute after the polymerization initiation. To this contracted hydropolymer, ultraviolet ray of light energy of 210 ml/cm$^2$ was irradiated from the ultraviolet ray irradiation unit 180 (Model VB15201BY from Ushio Inc.) installed at the ceiling of the continuous polymerization device. A gel sheet made of the gel-like hydropolymer was recovered at the endless belt end, followed by introducing to a meat chopper through a discharge part to cut to pieces continuously. The cut hydropolymer was dried for 40 minutes by use of a hot air dryer controlled at 180° C., then pulverized by a portable pulverizer. Then the pulverized material was classified by use of a screen having 600 μm and 300 μm mesh to obtain a base polymer (3) having a particle diameter of 300 to 600 μm in most portion. The polymerization conditions and the properties of the base polymer are summarized in Table 1.

Comparative Example 1

Figure 11:
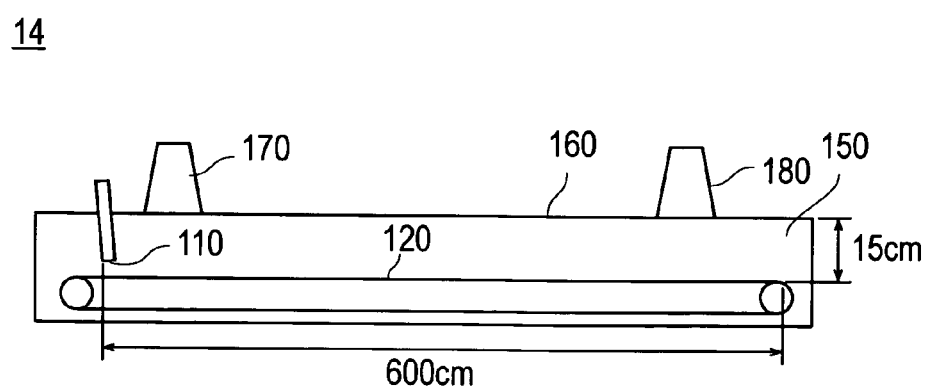
FIG. 11 is a schematic view of a continuous polymerization device used in Comparative Example 1.

A monomer aqueous solution was fed to the endless belt in accordance with similar procedure as in Example 1, except that the continuous polymerization device 14 with constant device height of 15 cm, shown by FIG. 11, was used.

To the monomer aqueous solution fed to the endless belt, ultraviolet ray of light energy of 9 mJ/cm$^2$ was irradiated from the ultraviolet ray irradiation unit 170 (Model MT-4020 from Toshiba Light and Technology Corporation) installed at the ceiling of the continuous polymerization device, which results in the rapid polymerization and the expansion while emitting steam. At the maximum expansion, the expansion ratio of the hydropolymer (A/C) was 65 and the space ratio in the device (B/A) was 1.1. Thus expanded hydropolymer contacted in about 1 minute after polymerization initiation. To this contracted hydropolymer, ultraviolet ray of light energy of 110 mJ/cm$^2$ was irradiated from the ultraviolet ray irradiation unit 180 (Model VB15201BY from Ushio Inc.) installed at the ceiling of the continuous polymerization device. A gel sheet made of the gel-like hydropolymer was recovered at the endless belt end, followed by introducing to a meat chopper through a discharge part to cut to pieces continuously. The cut hydropolymer was dried for 40 minutes by use of a hot air dryer controlled at 180° C., then pulverized by a portable pulverizer. Then the pulverized material was classified by use of a screen having 600 μm and 300 μm mesh to obtain a base polymer (4) having a particle diameter of 300 to 600 μm in most portion. The polymerization conditions and the properties of the base polymer are summarized in Table 1.

Comparative Example 2

The polymerization was carried out by using the continuous polymerization device 11 shown by FIG. 8.

A monomer aqueous solution was prepared by continuously feeding to a mixer and mixing, under flow rate set as follows: 48.5 wt % of sodium hydroxide aqueous solution at 8.25 g/sec, acrylic acid at 10.2 g/sec, 30 wt % of polyethylene glycol diacrylate (number average molecular weight: 523) aqueous solution(I) at 0.112 g/sec; solution(II) of 20 wt % of acrylic acid aqueous solution 97.9 part by weight dissolved with 2-hydroxymethyl-2-methylpropiophenone 0.989 part by weight and diethylenetriamine pentaacetic acid three sodium salts 1.08 part by weight at 0.126 g/sec and water at 8.75 g/sec. The temperature of the monomer aqueous solution at this time was 96° C. To this monomer aqueous solution, 3 wt % of sodium persulfate aqueous solution was further added at 0.381 g/sec, and then the monomer aqueous solution was fed to the endless belt running at 400 cm/min. and maintained at about 100° C. The monomer aqueous solution was fed continuously so that the thickness "D" of the charged monomer aqueous solution was 0.35 cm and the width of the charged monomer aqueous solution was 10 cm. The height ratio of the device (E/D) was 114 and 43 at the former portion and the latter portion respectively.

To the monomer aqueous solution fed to the endless belt, ultraviolet ray of light energy of 8 mJ/cm$^2$ was irradiated from the ultraviolet ray irradiation unit 170 (Model MT-4020 from Toshiba Light and Technology Corporation) installed at the ceiling of the continuous polymerization device, which results in the rapid polymerization and the expansion while emitting steam. At the maximum expansion, the expansion ratio of the hydropolymer (A/C) was 20 and the space ratio in the device (B/A) was 27. Thus expanded hydropolymer contacted in about 1 minute after polymerization initiation. To this contracted hydropolymer, ultraviolet ray of light energy of 170 mJ/cm$^2$ was irradiated from the ultraviolet ray irradiation unit 180 (Model VB15201BY from Ushio Inc.) installed at the ceiling of the continuous polymerization device. A gel sheet made of the gel-like hydropolymer was recovered at the endless belt end, followed by introducing to a meat chopper through a discharge part to cut to pieces continuously. The cut hydropolymer was dried for 40 minutes by use of a hot air dryer controlled at 180° C., then pulverized by a portable pulverizer. Then the pulverized material was classified by use of a screen having 600 μm and 300 μm mesh to obtain a base polymer (5) having a particle diameter of 300 to 600 μm in most portion. The polymerization conditions and the properties of the base polymer are summarized in Table 1.

Comparative Example 3

The polymerization was carried out by using the continuous polymerization device 11 shown by FIG. 8.

A monomer aqueous solution was fed to the endless belt, in accordance with similar procedure as in Example 1, except that the temperature of the monomer aqueous solution before adding an aqueous solution of sodium persulfate was set at 75° C., by cooling with a cooling unit installed after a mixer.

To the monomer aqueous solution fed to the endless belt, ultraviolet ray of light energy of 5 mJ/cm$^2$ was irradiated from the ultraviolet ray irradiation unit 170 (Model MT-4020 from Toshiba Light and Technology Corporation) installed at the ceiling of the continuous polymerization device, which results in the polymerization of the monomer aqueous solution fed on the belt with fierce plosive sound. The polymerization and the crosslinking proceeded excessively before the temperature reached the boiling point. And, little expansion was observed. The expansion ratio of the hydropolymer (A/C) was 1.0 and the space ratio in the device (B/A) was 198. To this hydropolymer, ultraviolet ray of light energy of 110 mJ/cm$^2$ was irradiated from the ultraviolet ray irradiation unit 180 (Model VB15201BY from Ushio Inc.) installed at the ceiling of the continuous polymerization device. The hydropolymer was recovered, cut, dried and classified in accordance with similar procedure as in Example 1 to obtain a base polymer (6). The polymerization conditions and the properties of the base polymer are summarized in Table 1.

"A" (cm$^2$) and each evaluation value were calculated by the following methods (Calculation of "A")

A photo image of the hydropolymer during the polymerization was taken by a video camera to calculate a cross-sectional area in the maximum expansion in the belt width direction based on analysis of the photo image.

(Measurement of Residual Monomers)

To 1000 g of deionized water, 0.5 g of a water-absorbent resin was added, followed by extraction for 2 hours while stirring and filtering thus swelled and gelled water-absorbent resin with a filter paper to analyze a residual monomer amount in a filtrate by use of liquid chromatography. On the other hand, a calibration line was obtained by similar analysis on standard monomer solutions with known concentrations. The calibration line was used as external standard in determining residual monomer amount in the water-absorbent resin by consideration of dilution times of the filtrate.

(Measurement of Water-absorption Capacity Under No Load)

0.2 g of a water-absorbent resin was charged into a non-woven cloth bag (60 mm×60 mm) uniformly. And then the bag was immersed into 0.9 wt % of a NaCl aqueous solution (physiological saline solution). After 30 minutes, the bag was pulled out and water was removed by use of a centrifugal separator for 3 minutes under 250×9.81 m/S$^2$ (250 G) to measure bag weight W1 (g). By similar operation, weight W0 (g) was measured without using a water-absorbent resin. GV (water-absorption capacity with no load) was calculated by the following equation based on these weights, W1 and W0.

$$GV(g/g) = \{[W1(g) - W0(g)]/\text{weight of a water-absorbent resin (g)}\} - 1$$

(Measurement of Extractable Content)

Into a 250 ml plastic container with a cap, 184.3 g of 0.9 wt % of NaCl aqueous solution (physiological saline solution) was weighed and added, followed by adding 1.00 g of a water-absorbent resin into the aqueous solution, stirring for 16 hours, and extraction of soluble components in the resin. This extract was filtered with a filter paper and 50.0 g of thus obtained filtrate was weighed and sampled to be used as a measurement solution.

First, titration was carried out with 0.1 N NaOH aqueous solution till pH 10 by using only a physiological saline solution, followed by titration with a 0.1 N HCl aqueous solution till pH 2.7 to determine blank titration values ([bNaOH] ml, [bHCl] ml).

Similar titrations were carried out on the measurement solution to obtain titration value ([NaOH] ml, [HCl] ml).

For example, in the case of a water-absorbent resin containing acrylic acid and a sodium salt thereof, extractable content in the water-absorbent resin can be calculated by the following calculation equations based on weight average molecular weight thereof and the titration value obtained by the above operation.

$$\text{Extractable content (wt \%)} = 0.1 \times Mw \times 184.3 \times 100 \times ([HCl] - [bHCl])/1000/1.0/50.0$$

$$\text{wherein } Mw = 72.06 \times (1 - [\text{neutralization ratio}]/100) + 94.04 \times [\text{neutralization ratio}]/100$$

$$[\text{neutralization ratio}] \text{ (mol \%)} = \{1 - ([NaOH] - [bNaOH])/([HCl] - [bHCl])\} \times 100$$

(Measurement of Light Energy of Ultraviolet Ray)

Light energy of ultraviolet ray was measured by attaching a light receiver "UVD-S365" (Ushio Inc.) to an accumulated light energy counter of ultraviolet ray "UIT-150" (Ushio Inc.). The same irradiation position and time as the position and the time during polymerization of a water-absorbent resin was use.

TABLE 1

| | | | | | E | | space ratio in the device (B/A) | expansion ratio of the hydropolymer (A/C) | height ratio of the device (E/D) | | Residual monomers in base polymer (ppm) | GV of base polymer (g/g) | extractable content of base polymer (wt %) |
|---|---|---|---|---|---|---|---|---|---|---|---|---|---|
| | A | B | C | D | former | latter | | | former | latter | | | |
| Example 1 | 628 | 1943 | 9.8 | 0.49 | 40 | 15 | 3.1 | 64 | 82 | 31 | 370 | 41 | 13 |
| Example 2 | 235 | 1907 | 5.7 | 0.57 | 40 | 15 | 8.1 | 41 | 70 | 26 | 380 | 41 | 14 |
| Example 3 | 119 | 1907 | 4.2 | 0.42 | 40 | 15 | 16 | 28 | 95 | 36 | 330 | 42 | 15 |
| Comparative Example 1 | 637 | 705 | 9.8 | 0.49 | 15 | 15 | 1.1 | 65 | 31 | 31 | 590 | 41 | 13 |
| Comparative Example 2 | 70 | 1907 | 3.5 | 0.35 | 40 | 15 | 27 | 20 | 114 | 43 | 610 | 42 | 15 |
| Comparative Example 3 | 10 | 1943 | 9.8 | 0.49 | 40 | 15 | 198 | 1.0 | 82 | 31 | 720 | 43 | 20 |

A (cm$^2$): maximum cross-sectional area of the hydropolymer in polymerization in the width direction of the endless belt
B (cm$^2$): maximum cross-sectional area of space between the endless belt of the continuous polymerization device and the ceiling of the continuous polymerization device in the width direction of the endless belt
C (cm$^2$): the cross-sectional area (cm$^2$) of the charged monomer aqueous solution in the width direction of the endless belt
D (cm$^2$): the thickness (cm) of the charged monomer aqueous solution,
E (cm$^2$): maximum height (cm) from the endless belt to the ceiling of continuous polymerization device As shown in Table 1, properties of the water-absorbent resin are improved by using the continuous polymerization device where the sides and the ceiling are covered and implementing polymerization under the condition specified by the present invention.

The entire disclosure of Japanese Patent Application No. 2004-087874 filed on Mar. 24, 2004 including specification, claims, drawings, and summary are incorporated herein by reference in its entirety.

What is claimed is:

1. A method for continuous production of a water-absorbent resin by use of a continuous polymerization device comprising a charge part of a monomer aqueous solution containing a monomer, a polymerization initiator and a crosslinking agent; an endless belt on which the monomer and a hydropolymer formed are conveyed; and a discharge part of the hydropolymer,
wherein the monomer aqueous solution is fed to the endless belt at a temperature between 50° C. and 105° C.; the monomer is polymerized on the endless belt; and the continuous polymerization device has side walls and a ceiling, the space ratio in the device represented by the following equation 1 being in the range of 1.2 to 20:

Space ratio in the device=$B/A$ [Equation 1]

wherein A is a maximum cross-sectional area (cm$^2$) of the hydropolymer during the polymerization in the width direction of the endless belt, and B is a maximum cross-sectional area (cm$^2$) of the space between the endless belt of the continuous polymerization device and the ceiling of the continuous polymerization device in the width direction of the endless belt.

2. A method for continuous production of a water-absorbent resin according to claim 1, wherein the height ratio of the device represented by the following equation 3 is in the range of 10 to 500 at 90% or more of the polymerization zone:

Height ratio of the device=$E/D$ [Equation 3]

wherein D is a thickness (cm) of the charged monomer aqueous solution, E is a maximum height (cm) from the endless belt to the ceiling of the continuous polymerization device, and the polymerization zone means a zone from the charge part of the monomer solution to the discharge part of the hydropolymer.

3. A method for continuous production of a water-absorbent resin according to claim 2, wherein the height ratio of the device changes in the moving direction of the endless belt.

4. A method for continuous production of a water-absorbent resin according to claim 3, wherein the height ratio of the device at the charge part of the monomer aqueous solution is larger than the height ratio of the device at the discharge part of the monomer aqueous solution.

5. A method for continuous production of a water-absorbent resin according to claim 1, wherein ultraviolet ray is irradiated from an ultraviolet ray irradiation unit installed at the ceiling of the continuous polymerization device to the monomer aqueous solution or the hydropolymer.

6. A method for continuous production of a water-absorbent resin according to claim 1, wherein at least a part of the ceiling of the continuous polymerization device is movable in the direction of the height.

7. A method for continuous production of a water-absorbent resin according to claim 1, wherein the monomer is polymerized while vaporizing water contained in the monomer aqueous solution in boiling state.

8. A method for continuous production of a water-absorbent resin according to claim 1, wherein the temperature is in the range of 60° C. to 105° C.

9. A method for continuous production of a water-absorbent resin according to claim 1, wherein the polymerization time, which is defined as the time from time when the monomer aqueous solution added with the polymerization initiator is fed to the continuous polymerization device till time when the hydropolymer is discharged from the continuous polymerization device, is not longer than 5 minutes.

10. A method for continuous production of a water-absorbent resin according to claim 1, wherein the concentration of the monomer in the monomer aqueous solution is in the range of 40 wt % to 80 wt %.

11. A method for continuous production of a water-absorbent resin according to claim 1, wherein the difference, ΔT, between the initial temperature of the polymerization and the maximum temperature during the polymerization is not larger than 60° C.

12. A method for continuous production of a water-absorbent resin according to claim 1, wherein the temperature is in the range of 70° C. to 105° C.

13. A method for continuous production of a water-absorbent resin according to claim 1, wherein the temperature is in the range of 80° C. to 105° C.

14. A method for continuous production of a water-absorbent resin according to claim 1, wherein the temperature is in the range of 90° C. to 105° C.

15. A method for continuous production of a water-absorbent resin according to claim 1, wherein the initial temperature of the polymerization is in the range of 30° C. to 105° C.

16. A method for continuous production of a water-absorbent resin according to claim 1, wherein the monomer is at least one selected from unsaturated monomers.

17. A method for continuous production of a water-absorbent resin according to claim 1, wherein the monomer is acrylic acid, and the temperature of the monomer aqueous solution fed to the endless belt is raised by utilizing the heat of the neutralization generating in the neutralization of the acid group in the acrylic acid with alkali which is added in preparing the monomer aqueous before the polymerization.

18. A method for continuous production of a water-absorbent resin according to claim 1, wherein the maximum temperature during the polymerization is not higher than 120° C.

19. A method for continuous production of a water-absorbent resin according to claim 1, wherein the solid content of the produced hydropolymer after the polymerization is in the range of 50 wt % to 82 wt %.

20. A method for continuous production of a water-absorbent resin according to claim 1, wherein the hydropolymer after the polymerization is dried for the range of 1 min to 60 min at the range of 165° C. to 230° C.

21. A method for continuous production of a water-absorbent resin according to claim 1, wherein the hydropolymer after the polymerization is dried and pulverized, so that the weight average particle diameter (the Japan Industrial Standard) is the range of 300 μm to 600 μm, and the content of the water-absorbent resin with the particle diameter of not larger than 150 μm is in the range of 0 to 10 wt %.

22. A method for continuous production of a water-absorbent resin according to claim 1, wherein the thermal initiator is combined with the photoinitiator as the polymerization initiator.

23. A method for continuous production of a water-absorbent resin according to claim 1, wherein not less than 70 mol % and up to 100 mol % based on total moles of the monomers is acrylic acid and/or a salt thereof, and the use amount of the crosslinking agent is in the range from 0.001 to 1 mol % based on the total moles of the monomers, and the use amount of the polymerization initiator used is 0.001 to 2 mol % based on the total moles of the monomers.

24. A method for continuous production of a water-absorbent resin according to claim 1, wherein the expansion ratio of the hydropolymer represented by the following equation 2 is in the range of 2 to 500:

$$\text{Expansion ratio of the hydropolymer} = A/C \qquad \text{[Equation 2]}$$

wherein A is a maximum cross-sectional area (cm$^2$) of the hydropolymer during the polymerization in the width direction of the endless belt, and C is a cross-sectional area (cm$^2$) of the charged monomer aqueous solution in the width direction of the endless belt.

25. A method for continuous production of a water-absorbent resin by use of a continuous polymerization device comprising a charge part of a monomer aqueous solution containing a monomer, a polymerization initiator and a crosslinking agent; an endless belt on which the monomer and a hydropolymer formed are conveyed; and a discharge part of the hydropolymer, wherein the continuous polymerization device has side walls and a ceiling, and the space ratio in the device represented by the following equation 4 is in the range of 1.2 to 20:

$$\text{Space ratio in the device} = B/A \qquad \text{[Equation 4]}$$

wherein A is a maximum cross-sectional area (cm$^2$) of the hydropolymer during the polymerization in the width direction of the endless belt, and B is a maximum cross-sectional area (cm$^2$) of the space between the endless belt of the continuous polymerization device and the ceiling of the continuous polymerization device in the width direction of the endless belt; and the initial temperature of the polymerization is in the range of 30° C. to 105° C.; and the concentration of the monomer in the monomer aqueous solution is in the range of 35 wt % to 80 wt %.

* * * * *